United States Patent Office 2,923,413
Patented Feb. 2, 1960

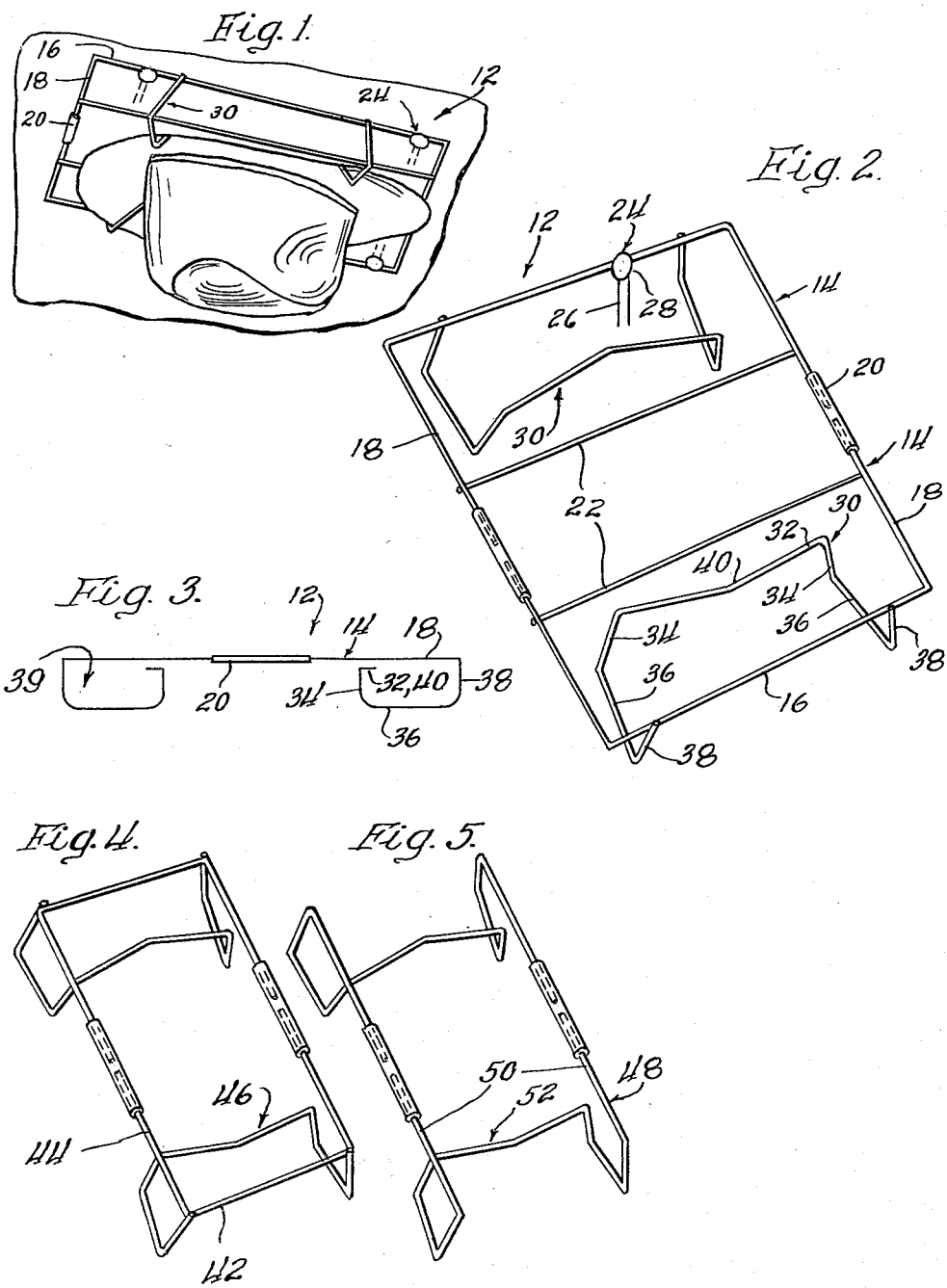
Feb. 2, 1960  J. G. BEHRENDT  2,923,413
AUTOMOBILE HAT RACK
Filed April 30, 1956
Inventor:
John G. Behrendt

2,923,413

AUTOMOBILE HAT RACK

John George Behrendt, Chicago, Ill.

Application April 30, 1956, Serial No. 581,622

2 Claims. (Cl. 211—31)

The present invention relates to a hat rack, and more particularly a hat rack adapted for suspension from the roof of an automobile.

The hat rack is designed and constructed for mounting on and suspension from the lining of the roof of the automobile and so constructed that an occupant, and particularly the driver, may insert his hat in it with one hand easily and without distraction, so that, for example, the driver's attention is not distracted from driving.

A broad object of the invention is to provide a hat rack of the foregoing general character of novel construction.

Another object is to provide a hat rack of the foregoing general character which has members engaging the brim of the hat, in which the brim-engaging members are of such construction as to accommodate brims of a wide variety of shapes, as for example, degrees of bend or curl.

Another and more specific object is to provide a hat rack of the character referred to immediately above, in which the elements that directly contact the hat brim do so at a position adjacent the crown and have deep drawn portions outwardly therefrom to accommodate without interference the bent or curled outer perimeter portion of the brim.

A still further object is to provide a hat rack of the character stated immediately preceding, in which a hat may be inserted in and removed from the rack with great facility.

Other objects are to provide a hat rack that is simple of construction and hence economical; to provide a form of hat rack in which most of the structural members are of such material as wire and in which weld joints are held at a minimum; to provide a form of device in which all weld joints are eliminated; and the provide a rack of the general character stated which, in one embodiment, has a large-expanse element such as a plate providing substantial area for use as advertising space.

Other objects and advantages will appear from the following detail description taken in conjunction with the accompanying drawing in which—

Figure 1 is a perspective view of a hat rack of the invention, mounted in place on the roof of an automobile, and holding a hat;

Figure 2 is a perspective view, looking downwardly and at an angle to the vertical;

Figure 3 is a diagrammatical side view;

Figure 4 shows a modified form, being a perspective view looking downwardly at an angle to the vertical; and, Figure 5 shows another modified form similarly being a perspective view looking downwardly at an angle to the vertical.

The specific manner of mounting the hat rack on the roof of an automobile does not constitute an essential part of the present invention but reference may be had to my copending application, Ser. No. 530,798, filed August 26, 1955, for a fastening means and mounting arrangement suitable for such purpose. In that application is shown an arrangement of placing the pins in a reinforced portion of the lining of the automobile roof, while a suitable form of pin is referred to hereinbelow.

Referring in detail to the drawings and particularly to Figures 1–3 thereof, showing a preferred form of the invention, the hat rack 12 of this form is made up chiefly of wire elements and includes a pair of complementary halves 14 each of which is generally U shape in outline form or plan view. The halves are substantially identical and each includes an intermediate element or portion 16 and parallel arms 18 extending from the ends thereof. The arms of each half are detachably connected with respective arms of the other half by suitable means such as sleeves 20, of plastic material for example, into which the ends of the arms are inserted and frictionally held. When the halves are so connected, they form a grid or frame of generally rectangular shape, lying substantially in a plane and adapted for fitting to the roof of the automobile and securement thereto. Preferably strengthening braces 22, which also are in the form of wires, interconnect the arms of the respective pairs, intermediate the ends of the arms 18, the braces being secured as by welding.

Fastening devices such as those shown at 24 may be utilized for securing the frame to the lining of the roof, in a manner explained in the above entitled application. The fastening devices 24 include pin elements 26 for projection through the lining and head portions 28 clampingly gripping a wire element of the frame. The frame may be regarded as having length and breadth, irrespective of actual relative dimensions, with respect to direction of insertion of a hat thereinto as will be explained later, the intermediate elements or portions 16 defining the sides, and the direction transverse thereto being the longitudinal direction.

Mounted on each frame half is a hat brim holder 30, the two being substantially identical and also formed of wire, being thereby adapted to shaping economically. Each holder 30 is generally of U shape, as viewed in plan, having a central portion 32 forming a brim rail and extending longitudinally. The holder 30 is bent downwardly at the ends of the brim rail at 34, horizontally at 36 and again upwardly at 38 where the ends of the wire are secured to the element 16 as by welding. The elements 34 and 38 are adjacent the vertical, or at least adjacent respective longitudinal planes, and the elements 34, 36 and 38 thus form bays 39 of substantial depth at substantially all points between the brim rail and element 16 (see particularly Figure 3), for accommodating the hat brim as will be explained below. The brim rail is below but quite close to, the plane of the frame for receiving the hat brim therebetween.

The two hat brim holders 30 extend from the elements 16 inwardly toward each other and the brim rails 32 are spaced apart a distance slightly greater than the transverse dimension of the hat crown. The brim rails are furthermore preferably bowed outwardly away from each other as by a bend or curve 40 to conform more closely to the curvature of the crown.

In the use of the hat rack of the invention, it is mounted on the automobile roof as above explained and as shown in Figure 1. When it is desired to hang up the hat, it is inverted and inserted between the hat brim holders to midway position and then released. The hat rests on the brim rails which engage the brim closely adjacent the crown. If the hat brim has a deep bend or curl, the bend begins a short distance outwardly from the crown, and it is easily received in the bays between the brim rails and elements 16 of the frame, which are of substantial depth. There is no interference with the brim by any portion of the frame. Even if the brim should be flat, or nearly flat, it will be accommodated as well. Hence the rack will accommodate brims of all shapes.

The brim rails, in direction transversely of the rack, are preferably no longer than the hat crown so as not to extend into and interfere with the curled portions of the brim at the ends, i.e., fore and aft of the crown. The bowed shape (40) of the brim rails facilitates reception of the crown between them while enabling them to lie close to the crown at substantially all portions. The rack can be adjusted in width direction by sliding the arms 18 inwardly or outwardly in the sleeves 20.

Attention is next directed to the modifications shown in Figures 4, 5, and 6. In each of these forms hat brim holders are utilized which have the same deep bays as in the forgoing embodiment, with the same effect in receiving and accommodating a deep-bend hat brim.

In the form of the invention shown in Figure 4, the length of the element 42 and the corresponding spacing of the arms 44 are less than the corresponding elements of the previous form (element 16, arms 18) and there is no reinforcing brace such as the brace 22 of the previous form. The hat brim holders 46, however, are nevertheless at least as great, in transverse direction, as the holders 30, to the end of accommodating a hat as well as the holders of the previous form. This form results in an extremely economical construction, each half consisting of only two wire pieces, and there being only two weld joints in each half—between the hat brim holder and element 42.

The form of hat rack of Figure 5 is even more simple. In this form, each half 48 is a single integral wire piece and is bent to have arms 50 corresponding to arms 18, and a hat brim holder 52. The hat brim holder 52 is of the same construction as the holders 30 and 46, but is an integral extension of the arms. There is no element such as the element 16 or 42, or reinforcing brace 22. There are no weld joints. The elimination of weld joints and the use of less wire material result in an extremely economical device.

The principal advantage of all of the hat racks disclosed herein resides in the deep draw of the rail-bearing brackets 30 which provide a deep, open-ended passageway on the outer side of each rail. In the copending application, each hat rail is farther from the plane of the frame than any point on the arms supporting the rail, whereas in this embodiment, the rail is close to the plane of the frame and the arms are well spaced therefrom. The hat, therefore, is held from displacement by the ends of the rails, where the hat has a brim, i.e., a Homburg, and by pressure against the side walls of the crown by the two rails, where the hat has a snap brim.

While I have shown certain preferred embodiments hereinabove, it will be understood that variations may be made therein within the scope of the appended claims.

I claim:

1. A hat rack of the character disclosed comprising a frame having longitudinally and transverse directions and lying essentially in a plane and adapted for fitting to the roof of an automobile for securement thereto, fastening devices at spaced locations on the frame for securing the frame to the roof, and a pair of hat brim holders secured to the frame at opposite sides and extending generally inwardly toward each other, each hat brim holder including a brim rail supported by a pair of arms having upright portions extending downwardly from the points of securement and from the brim rail disposed closely adjacent respective longitudinal planes, and intermediate portions lying a substantial distance below the brim rail, the brim rails being disposed a short distance below said plane, said holders defining bays extending downwardly from said brim rails and said plane a substantial distance at substantially all points between the brim rail and said points of securement, the brim rails being spaced apart a distance slightly greater than the transverse dimension of a hat crown enabling insertion of an inverted hat therebetween in longitudinal direction, the brim rails thereupon engaging the brim closely adjacent the crown and supporting the hat at those points, and the depth of the bay formed by said arms being sufficient to receive the outer peripheral portion of a hat brim having a substantial bend or curl.

2. A hat rack comprising two like-sized U-shaped frames made of wire disposed in a plane with the arm ends of one in axial alignment with the arm ends of the other, an open-ended sleeve of slightly expansible material and of a diameter such as to frictionally hold the wire positioned over each of opposed ends of the two U-shaped frames, and a brim holder for engaging one side of a hat mounted on each U-shaped frame and extending to one side and then toward the other frame for a distance sufficient to receive a hat brim between itself and the frame.

References Cited in the file of this patent

UNITED STATES PATENTS

| | | |
|---|---|---|
| D. 170,315 | Gerber | Sept. 1, 1953 |
| 727,252 | Allen | May 5, 1903 |
| 1,161,539 | Siever | Nov. 23, 1915 |
| 1,732,764 | Mendelsohn | Oct. 22, 1929 |

FOREIGN PATENTS

| | | |
|---|---|---|
| 354,996 | Great Britain | Aug. 20, 1931 |